United States Patent

Williams et al.

[15] 3,686,741
[45] Aug. 29, 1972

[54] METHOD AND MEANS FOR APPLYING O-RINGS

[72] Inventors: Earl J. Williams; James E. McLain, both of Cincinnati, Ohio

[73] Assignee: Precision-Cincinnati, Inc., Cincinnati, Ohio

[22] Filed: Feb. 8, 1971

[21] Appl. No.: 113,162

[52] U.S. Cl. ..................29/450, 29/208, 29/235
[51] Int. Cl. ....B23p 11/02, B23p 19/04, B23p 19/02
[58] Field of Search.....................29/450, 235, 208

[56] References Cited

UNITED STATES PATENTS

| | | | |
|---|---|---|---|
| 2,999,707 | 9/1961 | Kniepkamp et al. | 29/450 UX |
| 3,238,609 | 3/1966 | Nichols | 29/235 |
| 3,319,325 | 5/1967 | Nessamar et al. | 29/235 |
| 3,393,440 | 7/1968 | Wilson | 29/235 |
| 3,581,379 | 6/1971 | Drobilits | 29/450 |

FOREIGN PATENTS OR APPLICATIONS 341,802   1/1931   Great Britain...............29/235

Primary Examiner—Charlie T. Moon
Attorney—Wood, Herron & Evans

[57] ABSTRACT

Method and means for seating a resilient O-ring in an annular groove in a cylindrical part, said part having a tapered end adjacent said groove, in which the O-ring is interposed between the tapered end of the part and a deformable, resilient body, and the part and body then moved relatively toward one another such that the tapered end of the part passes through the O-ring and deforms the body by indenting it to the extent that surfaces of the body are presented to the O-ring to press the O-ring relatively over the tapered end of the part to the groove to seat therein.

14 Claims, 9 Drawing Figures

INVENTORS
Carl J. Williams
James E. McLain
BY Wood, Herron & Evans
ATTORNEYS

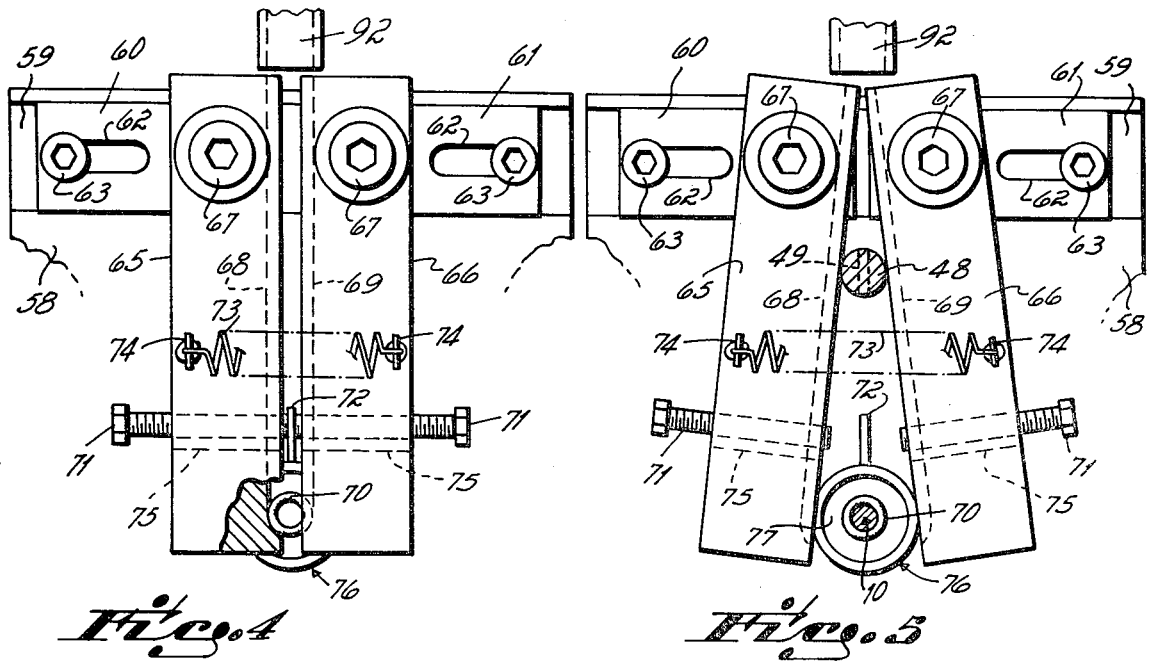
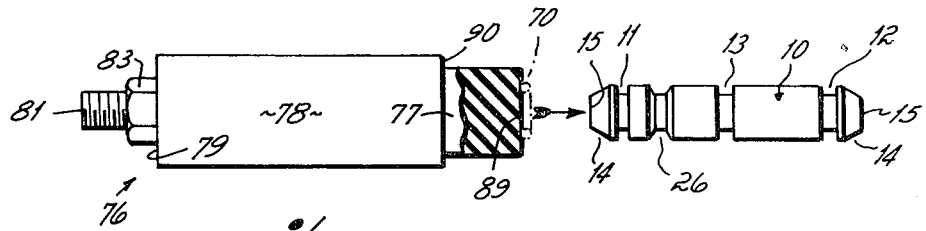
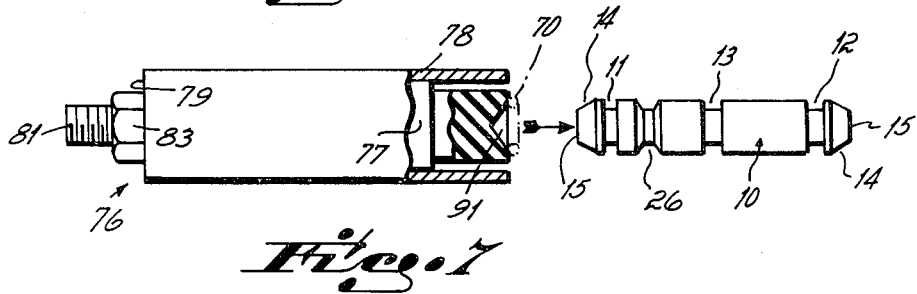

METHOD AND MEANS FOR APPLYING O-RINGS

This invention relates to a method and means for seating O-rings in grooves in cylindrical parts such as spools, pistons, shafts and the like. More particularly the invention is directed toward a method and means for seating O-rings at a high rate of production.

The invention is adaptable for use for O-rings over a wide size range, but as will be seen, it has its greatest utility for O-rings of small diameter, for example those that are about three-sixteenths of an inch or less.

O-rings in this size range have been especially difficult to handle on a high rate basis. The problem is that an O-ring must be stretched or increased in circumference to permit it to pass over the outside diameter of the part to reach the groove that is to receive it.

Machines have been provided in the past for seating O-rings. One such machine used for seating comparatively large O-rings, inserts fingers into the O-ring and then moves the fingers apart so that the O-ring is stretched sufficiently to clear the outside diameter of the part. The O-ring is then brought into alignment with the groove that is to receive it, held there while the fingers are withdrawn, and thus permitted to snap into place in the groove. This mechanism is both difficult and expensive to miniaturize for O-rings of small diameter and further it has not proven to be suitable for sustained use at high speed production rates.

The method and means of this invention are based upon an entirely different principle. No fingers are used to stretch or deform the O-rings. The invention entails the use of a deformable, resilient body made of an elastomeric material such as polyurethane or a high durometer rubber. The cylindrical part having the annular groove therein to receive the O-ring has a tapered end adjacent (i.e., ahead of) the groove. The O-ring to be seated is interposed between the resilient body and the tapered end of the part. The body and part are then moved relatively toward one another such that the tapered end of the part passes through the O-ring indenting the body to the degree that surfaces of the body are presented to the O-ring that cause it to move relatively over the tapered end of the part to the groove, whereupon the O-ring snaps into the groove to seat therein. The body and part are then moved relatively away from one another, the part carrying with it the O-ring and the body, because of its resilient nature, immediately regaining its shape ready for the next operation.

Preferably a machine incorporating the principles of this invention comprises an endless carrier, such as a turntable, having a number of holding devices thereon to receive individually the parts to which O-rings are to be applied. Indexing mechanism is provided to advance the carrier step-wise to bring each part in turn to an applicator station. At this station, the part is held against movement with the tapered end thereof disposed opposite a reciprocable head in which is mounted a cylinder of polyurethane. The cylinder and part are aligned axially with the cylinder presenting an endwise face to the tapered end of the part. Means are provided to feed the O-rings and position them one at a time such that a positioned O-ring is interposed between the endwise face of the cylinder and the tapered end of the part with its central axis aligned with their axes. The head then reciprocates, the movement taking but a fraction of a second. During the initial movement of the head the interposed O-ring receives the tapered end of the part. Continued movement causes the tapered end to pass through the O-ring, progressively indenting the face of the resilient cylinder. As the indenting deformation of the cylinder proceeds, surfaces thereof surrounding the embedded tapered end of the part press against the O-ring forcing it relatively over the tapered end until it snaps into the groove. The head then retracts, another O-ring is positioned and another part is indexed into place for the next application.

As stated, it is preferred for economy and simplicity that a cylinder of polyurethane be used at the applicator station. This material is found to have good wear-resistant qualities. But, as will be apparent, other elastomeric materials may be used and the end surface configuration of the elastomeric body is not critical. A flat facial surface may be provided for presentation to the O-ring. Further, it is found that a tapered recess or internal cavity of other configuration may be formed in the end face within the circular area thereof that contacts the O-ring to facilitate deformation and thereby minimize wear.

It may be seen therefore that the main feature of this invention is that the instrument that contacts and applies the O-rings has no moving parts in the sense in which this phrase is ordinarily used to describe mechanisms. Thus, the invention avoids the difficulties, and expense, and frailties of the miniaturized mechanical finger devices of the prior art.

Other features and advantages of the invention will appear in the following description of the accompanying drawings, in which:

FIG. 4 is a fragmentary view taken along the line 4—4 of FIG. 2;

FIG. 5 is a view similar to FIG. 4 taken along the line 5—5 of FIG. 3;

FIG. 6 is a diagrammatic side elevational view of the basic components involved in the application of an O-ring to a part, this view illustrating a modified form of the invention;

FIG. 7 is a view similar to FIG. 6 showing another modified form of the invention;

FIG. 8 is a fragmentary cross-sectional view taken along the line 8—8 of FIG. 1;

FIG. 9 is a fragmentary cross-sectional view taken along the line 9—9 of FIG. 1.

Figure 1:
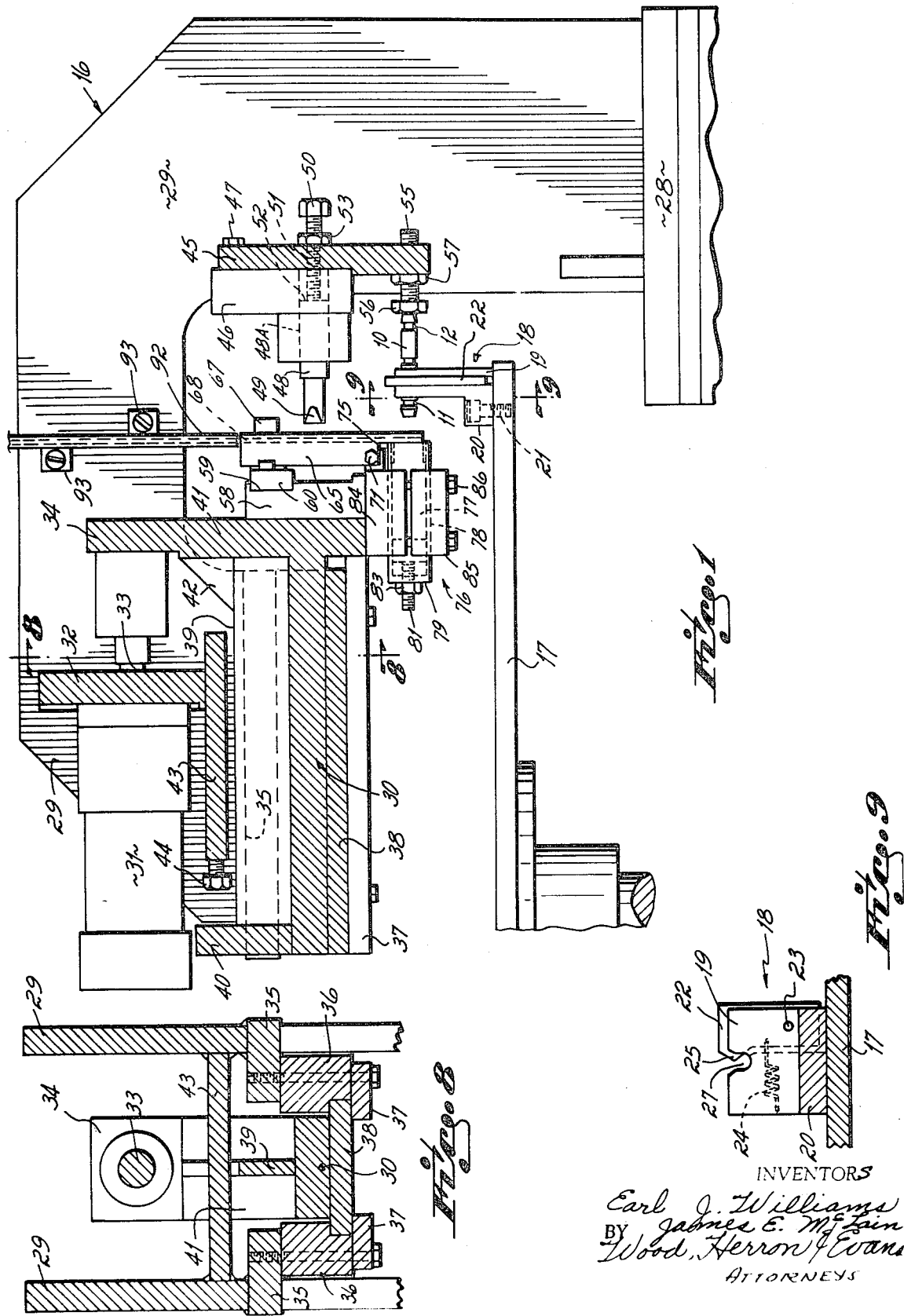
FIG. 1 is a side view, shown partly in section, of an O-ring applicator station of a typical machine incorporating the principles of this invention.

Reference is made to FIGS. 6 and 7 which show a typical part 10, this part being representative of a device such as a valve element or piston adapted for use in a hydraulic valve mechanism. The part 10 shown has an annular O-ring groove 11 at one end thereof, and an O-ring annular groove 12 at the opposite end thereof and an O-ring groove 13 that is centrally located. In the case shown both ends of part 10 are tapered as at 14, 14. In both instances exemplified the taper starts closely adjacent to annular grooves 11 and 12. Each taper 14 has a flat endwise face 15. The exact configuration of this face is unimportant, and it may alternatively be semi-circular or of some other arcuate configuration. The main feature of the endwise portion of part 10 is the taper shown at 14. This need not necessarily be a straight taper as shown; it could be arcuate, and it will be apparent that the entire endwise position of part 10 could be in the shape of the nose of a bullet.

As pointed out, the method and means of this invention are adapted for use at high rates of production. The general concept is to bring a series of parts such as the one indicated at 10 to an applicator station such as the one indicated generally by the numeral 16 in FIG. 1 of the drawings. The means for transporting the parts to this station may take many forms. In FIG. 1 a turntable 17 is shown fragmentarily only. It will be understood that this fragmentary showing is intended to be representative of the many means for transporting parts to the station. Appropriate drive, indexing and timing mechanisms are required in the operation of the machine, but here again these devices may take so many different forms, well known to those skilled in the art, that specific examples are believed to be unnecessary.

The turntable 17 has mounted upon it, in equally spaced points adjacent to its periphery, a plurality of part carriers such as the one indicated generally by the numeral 18. Only one such carrier is shown in the drawings. The turntable is arranged to rotate about a vertical axis, although it will be apparent that it is entirely practical to substitute a turret adapted to rotate about a horizontal axis for the table shown. As shown, a carrier 18 may comprise an upright 19 having a foot 20 thereon by which is may be bolted to the turntable 17 as indicated at 21. The slotted upright 19 receives a latch plate 22 pivoted as at 23 and urged toward the upright position illustrated in FIG. 9 by means of a coil spring 24. The latch plate 22 has a nose 25 thereon that is adapted to engage in a groove 26 in a part 10 as illustrated in FIGS. 6 and 7. A cross groove 27 is slotted upright 19 of the carrier provides a cradle for part 10, the part 10 resting in the cradle with its axis disposed horizontally. The carrier construction shown is adapted for simple snap-in and snap-out insertion and removal of parts, which may be done by hand or by mechanical means not shown. An applicator assembly comprising station 16, in the instance shown, is mounted on a base 28 at one side of turntable 17. It consists of a frame in the form of two cantilever arms 29 that extend upwardly from base 28 and overhang turntable 17 as illustrated in FIG. 1. The spacing of arms 29, 29 is shown in FIG. 8. A slidable carriage 30 is mounted between the cantilever arms above table 17. Carriage 30 is adapted to be reciprocated by a double acting pneumatic piston and cylinder assembly 31 that is secured to a cross brace 32 extending between arms 29, 29. A piston rod shown at 33 is fastened to a carriage 30, being attached to an upward projection shown at 34. Arms 29, 29 have bars 35, 35 affixed to them by means such as welding, the respective bars paralleling each other in spaced relation as shown in FIG. 8. Each bar 35 has mounted at its underside a block 36 and a plate 37 the two defining between them a way for a slide plate 38 affixed to the underside of carriage 30. A web 39 extends the full length of the top of carriage 30 to rigidify it. The inner end of carriage 30 has an upright abutment block 40 affixed to it. The opposite end has a face plate 41 affixed to it. The end of web 39 adjacent face plate 41 is angulated as at 42 in order to rigidify and further strengthen face plate 41. As shown the upright 34 may be formed as a continuation of face plate 41. Between carriage 30 and the pneumatic piston and cylinder assembly 31, a plate 43 extends horizontally between arms 29, 29 to rigidify the frame. Plate 43 also provides a means of mounting an adjustable stop in the form of a bolt 44 that cooperates with the abutment 40 to limit the movement of the carriage 30 in its movement to the right as viewed in FIG. 1.

The upright parts of the cantilever arms 29 opposite carriage 30 have a support plate 45 fastened to and extending between them, the plate being vertical. The face of plate 45 toward carriage 30 is machined to provide a seat for a mount block 46. This block 46 is fastened to plate 45 by means such as bolts 47. The mount block has a bore 48A extending horizontally therethrough in which is mounted a spreader pin 48. The outer end of this spreader pin is wedge shaped as shown at 49. Means such as a set screw or other device may be employed to lock the spreader pin 48 in position in bore 47. Provision is made to adjustably back up spreader pin 48 against inward pressure upon it by means such as a bolt 50 that threads through plate 45 as at 51 and into bore 47 to contact the inner end 52 of spreader pin 48. A lock nut 53 is provided to fix the position of bolt 50.

The lower end of plate 45 is threaded as shown at 54 to receive a backup bolt 55. The head of bolt 55 shown at 56 provides an abutment for a part 10 at the application station. Bolt 55 is fixed in position by means of a lock nut 57. Bolt 55 is adjusted such that once a part rotates into the position shown in FIG. 2, head 56 prevents any movement of part 10 to the right as viewed in FIG. 2.

Again referring to FIG. 2, face plate 41 on carriage 30 has a cross plate 58 fastened to it. The upper portion of plate 58 is machined as shown at 59 to provide a way in which two adjustable mount blocks 60–61 are seated. As shown in FIG. 4, each of the mount blocks 60–61 has a slot 62 in it through which a clamp bolt 63 passes to thread into plate 58 as shown at 64 in FIG. 2. A pair of guide fingers 65, 66 are pivotally mounted on and depend from the adjacent ends of mount blocks 60–61. A bolt 67 is provided for each finger 65, 66 the bolts arranged to hold the finger to its mount block while permitting swinging movement of the lower ends of finger 65, 66 toward and away from one another. The adjacent face of fingers 65, 66 are grooved as at 68, 69, the two grooves providing a chute for an O-ring 70. Grooves 68 and 69 stop short of the lower ends such that an O-ring 70 passing down through the chute stops and is held in fixed position between the grooves 68 and 69 in the position shown in FIG. 4. Each finger 65, 66 has an adjustment screw 71 extending horizontally through it, the respective screws 71, 71 making contact with the opposite faces of a blade 72. The lower ends of the two fingers are urged toward each other by means such as coil spring 73. The opposite ends of spring 73 are hooked to spade bolts 74, 74, one on each finger. Thus the adjustment screws and the positions of the mount blocks 60, 61 are set such that the grooves 68, 69 parallel one another to provide a straight, vertical chute for an O-ring.

The rear parts of the lower ends of respective fingers 65, 66 are cut away as shown at 75, 75 to clear an O-ring applicator device which is identified generally by the numeral 76.

Figure 2:
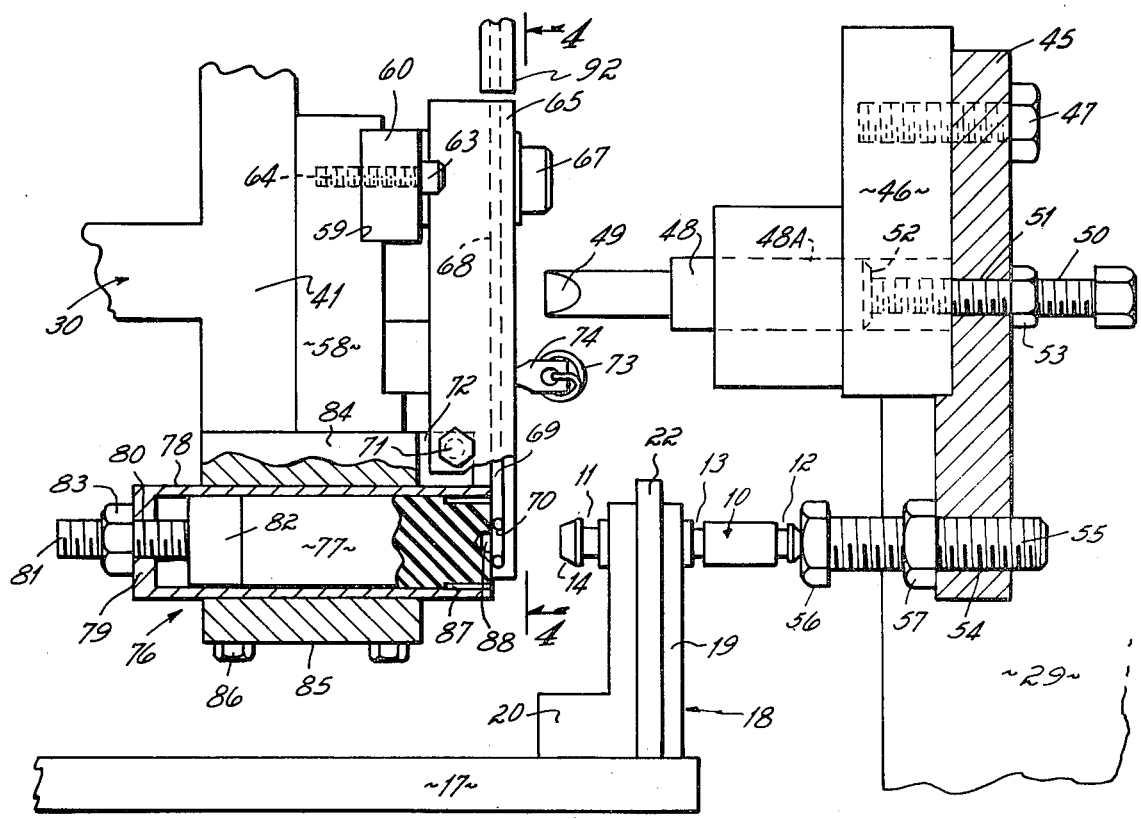
FIG. 2 is an enlarged fragmentary view, shown partly in section, illustrating the components of the head that are directly associated with the application of an O-ring to a part. In this view the components of the machine are shown at the start of an O-ring application cycle.

Applicator device 76 comprises a body of elastomeric material which may be in the shape of the cylinder shown at 77. This cylinder is carried in a tube 78, which tube is open at the end thereof adjacent the O-ring chute provided by grooves 68, 69 in fingers 65, 66, but closed as at the opposite end thereof as shown at 79. The closed end of tube 78 has a threaded bore 80 extending axially through it to receive a threaded stud 81 having cylindrical head 82 on it within tube 78. Cylindrical head 82 acts as a backup member and positioning device for cylinder 77. A lock nut 83 fixes the position of threaded stud 81. As shown in FIG. 2 the open end of tube 78 and the outer end of the elastomeric cylinder 77 terminate in a common plane. The grooves 68, 69 in the respective fingers 65, 66 are disposed such that an O-ring falling down the chute stops in a position in which it is centered with respect to the longitudinal axis of elastomeric cylinder 77 and in close proximity or contact with the outer face of cylinder 77.

Figure 3:
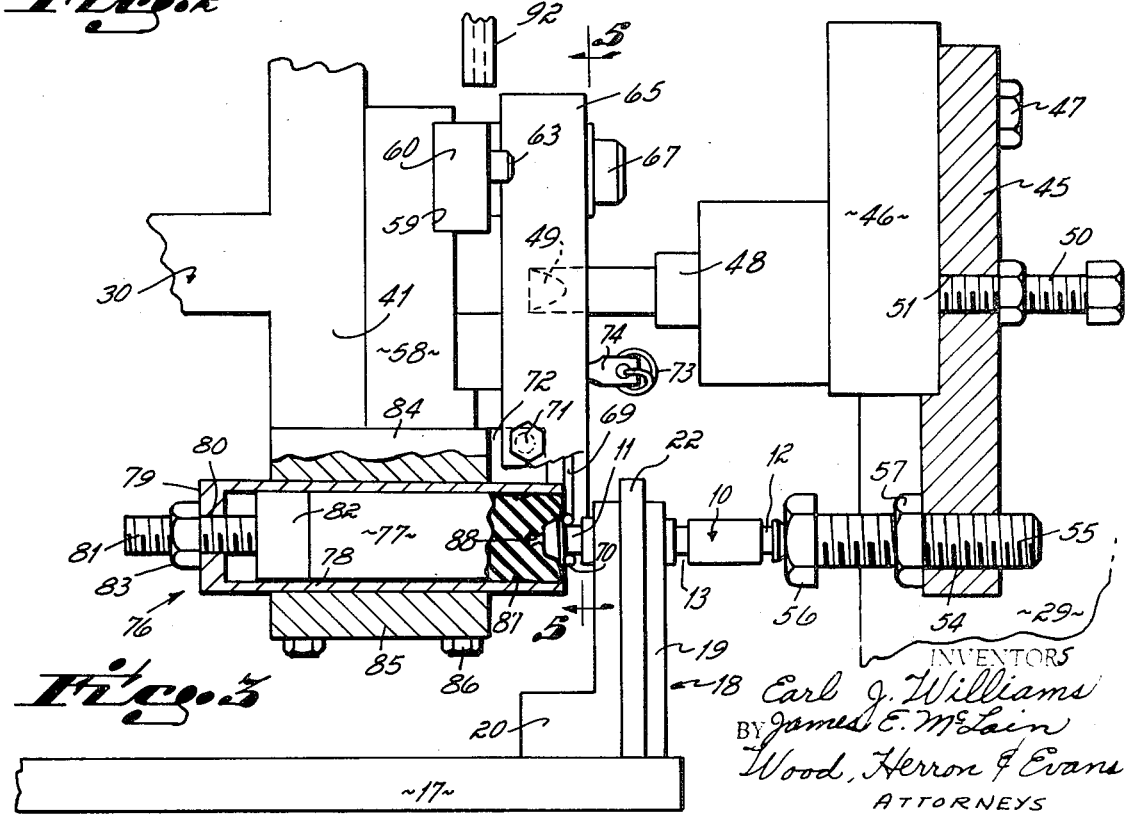
FIG. 3 is a view similar to FIG. 2 showing the components of the machine in that part of the cycle when an O-ring is first seated in an annular groove in a part.

As will be apparent from a comparison of FIGS 2 and 3, that movement of carriage 30 to the right causes the fingers 65, 66 to come in contact with the wedged end 49 of spreader pin 48 so that the lower ends of the fingers swing away from the positions shown in FIG. 4 to the positions shown in FIG. 5. When the carriage retracts the fingers 65, 66 are withdrawn to be clear of spreader pin 48 so that the lower ends again swing toward one another into the positions shown in FIG. 4 thereby again forming a chute for an O-ring 70. It is important from the viewpoint of the successful operation of the mechanism shown that the tapered end 14 of a part positioned as shown in FIG. 2 be in contact with an O-ring 70 opposite it, to give the O-ring support, prior to the spreading of fingers 65, 66 by spreader pin 48.

The tube 78 is held in place at the lower end of face plate 41 between blocks 84 and 85, these blocks being grooved to seat the respective upper and lower sides of tube 78 with the lower block 85 being clamped to the upper block 84 to hold the tube 78 in place by bolts such as those shown at 86. The blade abutment 72 may be formed as a continuation of upper block 84 as shown in FIG. 2.

Cylinder 77 may be formed of various different types of elastomeric materials although a polyurethane material or a rubber of high durometer are preferred. As has been suggested, the exact shape of the elastomeric body is not at all critical to the successful operation of the invention. A cylinder of this material is shown in the drawings simply because such a shape is easy to form and mount in position. In the area adjacent the open end of tube 78, the cylinder 77 is of reduced diameter as shown at 87. Further the central endwise area of cylinder 77 has a cavity 88 therein which in the instance of FIG. 2 is substantially cylindrical. As shown in FIG. 2 the O-ring rests against the outer face of cylinder 77 making contact with it in a circular area in which the contacting face of cylinder 77 is flat. Further the circular area of contact is spaced slightly outwardly from the cavity 88. The relieved outer portion 87 and the central cavity 88 of the cylinder 77 provide deformation relief as will be seen in the description set forth below of the operation of the mechanism.

It is found that it is not an absolute necessity that the cavity 88 be provided in the exposed end of cylinder 77. Such an arrangement is shown in FIG. 6 wherein the outer end of cylinder 77 is shown planar as at 89. In this instance the tube 78 stops short of the outer end of cylinder 77 as at 90. Further the central cavity does not have to be of the configuration shown in FIG. 2. A conical cavity 91 is shown in FIG. 7. It will be noted however that the outer perimeter of the cavity 91 forms a circle that is slightly smaller than the O-ring so that a circular surface of elastomeric material is presented to the O-ring.

Individual O-rings such as the one shown at 70 may be delivered to the groove 68, 69 in fingers 65, 66 through a chute such as the one shown fragmentarily only at 92, this chute being attached to one of the arms 29 by means such as brackets 93. Chute 92 may be in communication at its upper end with a supply hopper having a metering device associated therewith for feeding O-rings one at a time to chute 92 through which they fall by gravity to the position between fingers 65, 66 illustrated in FIG. 4. Appropriate timing mechanism interconnected with other timing mechanisms for the machine generally may be employed to insure the delivery of an O-ring during each cycle.

In the operation of the machine individual parts 10 are delivered along a circular, horizontal path by means of the turntable 17 to arrive, one at a time into the position illustrated in FIG. 1 where they are disposed between the O-ring applicator device and the backup bolt 55. In this position the longitudinal central axes of part 11 and the elastomeric cylinder 77 and the central axis of O-ring 70 are in alignment. Air may then be directed to the cylinder 31 to cause the applicator device to shift to the right from the position shown in FIG. 1 to the position shown in FIG. 3. In this movement the tapered endwise portion 14 of part 10 passes through O-ring 70 and embeds into the elastomeric cylinder 77. During this movement the endwise portion of cylinder 77 is deformed by the indenting of tapered end 14 into it. Such indentation presents surfaces of the elastomeric body or cylinder 77 to the one face of the O-ring that press the O-ring relatively over the tapered end of the part to the groove 11 to seat therein. During the movement of the applicator device 76 toward the right the respective fingers 65, 66 come into contact with the spreader pin 48 and they are forced apart as illustrated in FIG. 5 to provide clearance for part 10.

In a typical O-ring applicator machine there may be more than one applicator station, that is two or even three such applicator stations may be employed. The components forming the applicator station are arranged for placing O-rings in grooves such as the one shown at 11. At a following station the position of those parts in the machine shown to the left of part 10 in FIG. 2 may be exchanged with those parts shown at the right in FIG. 2 and thus O-rings successively mounted on parts are seated in grooves such as the one illustrated at 12.

Having described my invention, what we desire to claim and protect by Letters Patent is:

1. The method of seating an O-ring in an annular groove in a cylindrical part, said part having a tapered end, said method comprising the steps of,
   a. providing a deformable, resilient body
   b. arranging said part and said body with respect to one another such that the tapered end of said part is directed toward said body
   c. interposing said O-ring between said tapered end and said body, and
   d. moving said part and said body relative to one another such that the tapered end of the part passes through said O-ring and deforms said body by indenting it to the degree that it presents surfaces to the O-ring that push the O-ring relatively over the tapered end of said part to said groove to seat therein.

2. The method as set forth in claim 1 in which said part is held stationary and said body is moved toward said part.

3. The method as set forth in claim 2 in which the interposed O-ring is moved with said body toward said part.

4. The method as set forth in claim 1 in which said cylindrical part is arranged with its central axis horizontal and said O-ring is interposed and positioned with its central axis aligned with the central axis of said cylindrical part.

5. Means to seat an O-ring in an annular groove in a cylindrical part, said part having a tapered end, said means comprising,
   a. a deformable, resilient body
   b. means to hold said part and said body such that the tapered end of said part is directed toward said body,
   c. means to position said O-ring such that it is interposed between the tapered end of said part and said body, and
   d. means to cause relative movement between said part and said body such that the tapered end of said part passes through said O-ring and deforms said body by indenting it to the degree that it presents surfaces to the O-ring that push the O-ring relatively over the tapered end of said part to said groove to seat therein.

6. Means as set forth in claim 5 in which said means to position said O-ring is related to the means to hold said part such that the central axes of said O-ring and said part are aligned.

7. Means as set forth in claim 5 in which said body has a normally planar facial area thereon disposed to contact one side of said O-ring during said relative movement between said part and said body.

8. Means as set forth in claim 7 in which said body has a cavity therein centered within said normally planar facial area.

9. Means as set forth in claim 5 in which said deformable, resilient body is cylindrical and the means to hold said part and said body arranged such that the longitudinal central axes of the body and the part are aligned.

10. Means as set forth in claim 5 in which said means to cause relative movement between said part and said body is arranged such that the part is stationary and the body moves toward said part.

11. Apparatus for seating an O-ring in an annular groove in a cylindrical part, said part having a tapered end adjacent said groove, said means comprising,
    a. a deformable, resilient body
    b. means to hold said part and said body such that the tapered end of said part is directed toward an end surface of said body,
    c. means to position said O-ring such that it is interposed between the tapered end of said part and said body,
    d. the positioning means comprising two openable jaw-like fingers holding said O-ring between them,
    e. means to cause relative movement between said part, fingers and said body such that the tapered end of said part passes through said O-ring, said fingers are opened to release said O-ring when said O-ring is engaged by said part, and said body is deformed by indenting sufficiently that said body engages the O-ring and holds it while said part is moved relatively through said O-ring deeper into said body until said O-ring is seated in said groove.

12. Apparatus as set forth in claim 11 in which said body is made of polyurethane.

13. Apparatus as set forth in claim 11 in which the fingers of the positioning means present opposed grooves forming a chute in which opposite edge portions of said O-ring slide.

14. Apparatus as set forth in claim 13 in which said fingers are biased together, and in which said fingers are opened when said O-ring is engaged by said part, by a spreader moving with said part.

* * * * *